United States Patent [19]

Cross et al.

[11] 4,186,473
[45] Feb. 5, 1980

[54] TURBINE ROTOR FABRICATION BY THERMAL METHODS

[75] Inventors: Kenneth R. Cross, Lebanon; Bruce A. Ewing, Martinsville, both of Ind.

[73] Assignee: General Motors Corporation, Detroit, Mich.

[21] Appl. No.: 933,262

[22] Filed: Aug. 14, 1978

[51] Int. Cl.² .................. B23P 15/04; B23R 13/00
[52] U.S. Cl. ................. 29/156.8 R; 228/127; 228/193; 228/212; 416/213 R
[58] Field of Search .......... 29/156.8 R, 447; 228/127, 243, 193, 212; 416/213

[56] References Cited
U.S. PATENT DOCUMENTS

| | | | |
|---|---|---|---|
| 1,078,906 | 11/1913 | Eldred | 228/127 |
| 1,825,239 | 9/1931 | Meyer | 29/447 |
| 2,450,493 | 10/1948 | Strub | 29/156.8 R |
| 2,800,706 | 7/1957 | Lindblom | 29/447 |
| 3,481,024 | 12/1969 | Bunn | 228/127 |
| 3,559,274 | 2/1971 | Granata | 29/447 |
| 3,747,197 | 7/1973 | Riel | 228/243 |
| 3,905,723 | 9/1975 | Torti, Jr. | 416/213 |
| 3,918,623 | 11/1975 | Ishiguro et al. | 228/127 |
| 4,096,615 | 6/1978 | Cross | 29/156.8 R |

*Primary Examiner*—Daniel C. Crane
*Attorney, Agent, or Firm*—J. C. Evans

[57] ABSTRACT

A method of fabricating a hybrid dual property wheel assembly includes the steps of preforming a bladed ring of a highly solidified alloy material including a base with a large diameter central opening therethrough and thereafter supporting a metal disc therein to form front and rear joint lines on either side of the juncture between the bladed ring and the disc. The method further contemplates direction of radio frequency energy to the disc to cause it to thermally expand into radially pressed contact with the inside diameter of the bladed ring at an interface therebetween while maintaining the disc and bladed ring under a continuous vacuum atmosphere and heated by the radio frequency energy for maintenance of a diffusion bond temperature between the expanded disc and the surrounding bladed ring of the wheel assembly to form a metallurgical connection therebetween by metal growth across the interface.

2 Claims, 11 Drawing Figures

TURBINE ROTOR FABRICATION BY THERMAL METHODS

This invention relates to dual property hybrid turbine rotor assemblies with parts of dissimilar metallurgical properties and more particularly to a method for fabricating such hybrid turbine rotors.

One method for manufacturing a hybrid dual property gas turbine wheel includes diffusion bonding an outer blade containing ring to an inner disc assembly of a differing metallurgy. This arrangement is set forth in copending U.S. application Ser. No. 804,142 filed June 6, 1977 to Ewing et al for "Hybrid Turbine Rotor", now U.S. Pat. No. 4,152,816. In the above described patent, diffusion bonding of the bladed ring and internal disc is accomplished by use of gas pressure to assist diffusion between the differing materials of the parts to be joined as the assembly is maintained at an elevated temperature. In the method of the aforesaid application, the bonding force between mated components is achieved by maintenance of a braze or weld seal along the exterior joint lines at the interface between the bladed ring and disc while gas pressure is excluded from entering the interface volume.

The bond force in the aforesaid method thus is a bonding force which equals gas pressure times the area of the parts which is normal to the bond interface. In such arrangements, diffusion bonding requires maintenance of the parts at an intimate contact face during a predetermined process diffusion time while holding a predetermined diffusion temperature to cause metal grain growth across the interface. U.S. Pat. Nos. 1,825,239 and 2,800,706 disclose turbine wheels with component parts connected by a mechanical bond produced by shrink fit of an outer part on an inner part. U.S. Pat. No. 2,798,141 discloses use of induction heat to join two metallic tubes. The prior art fails to disclose use of concentrated radio-frequency energy to simplify fabrication of dual property hybrid gas turbine wheels suitable for use in high temperature applications.

Accordingly an object of the present invention is to eliminate the need for a sealed brace or weld sealed joint at the exposed or exterior joint lines of an interface between a bladed ring and/or disc assembly that form a hybrid dual property gas turbine wheel and to do so by provision of an improved method of fabrication that includes the steps of preforming a bladed ring element of a first metal having a central opening therein with a controlled inside diameter; preforming a disc of a second metal with an outside diameter surface thereon of a controlled outer diameter that is press fit within the central opening of the bladed ring to form front and rear joint lines and thereafter supporting the joined parts on a ceramic support ring and locating a radio frequency power concentrator inboard of the ceramic support ring and in close proximity to the joined disc while subjecting the joined parts to a continuous vacuum; and directing radio frequency energy to the radio frequency concentrator for heating the disc to cause it to grow radially into firm interface contact with the inside diameter of the bladed ring while concurrently maintaining the disc heated to maintain a diffusion bond temperature between the thermally expanded disc and the outwardly located bladed ring at the interface therebetween to cause bond metal growth across the interface between the joined parts to produce a resultantly sound metallurgical joint formation therebetween.

Another object of the present invention is to provide an improved method for fabricating hybrid dual property wheel assembly that includes the steps of preforming a bladed ring of a first predetermined suitable high alloy material including a base ring with a central opening therethrough; machining the central opening to maintain a precise inside diameter in the base ring; preforming a powdered metal disc having a controlled diameter surface thereon; fitting the bladed ring and the outside diameter surface of the powdered metal disc to form a press fit interface therebetween; directing radio frequency energy to the disc of the joined parts to cause the disc to grow radially into pressed contact with the bladed ring at the interface therebetween; concurrently maintaining the press fit disc and bladed ring under a continuous vacuum atmosphere as the radio frequency energy is flowed to the disc; and maintaining a rate of radio frequency energy flow to the disc to maintain a diffusion bond temperature between the radially expanded disc and the bladed ring whereby the parts are maintained at a process diffusion temperature and in an evacuated condition at the interface region between the press fit parts to cause bond metal growth across the interface between the joined parts so as to produce a strong metallurgical bond between the disc and the bladed ring.

Further objects and advantages of the present invention will be apparent from the following description, reference being had to the accompanying drawings wherein preferred embodiments of the present invention are clearly shown.

In practicing the present invention, an initial step includes preforming a bladed ring including airfoils thereon. The bladed ring can be formed as a one piece solid ring with extruded airfoils or the bladed ring can be formed by a plurality of component parts to form an initially segmented airfoil to form the bladed ring.

The use of segmented airfoil components enables directionally solidified, air cooled airfoils of the type havin precisely, dimensionally controlled surfaces thereon to be utilized in a hybrid turbine wheel assembly made by the method of the present invention. An example of such directionally solidified air cooled airfoils is set forth in U.S. Pat. No. 3,732,031, issued May 8, 1973, to Charles E. Bowling et al for Cooled Airfoil.

Because of the use of a butt joint configuration used in the present invention, the existing airfoils of the type set forth in the preceding Bowling et al patent are modified by having a continuous surface at their base to define a ring having a machined inner diameter for a press-fit relationship to the outer diameter of a disc to be joined thereto.

Figure 1:
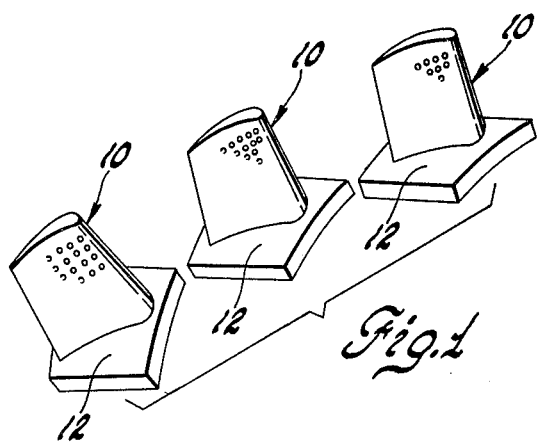
FIG. 1 is a view in perspective of airfoil components that are used in practicing the present invention.

The modified air cooled blades 10 are illustrated in FIG. 1 as including a base 12 cast integrally on the blade 10 to form part of an inner ring of a bladed ring to be described.

The next step in the method of forming a hybrid or composite turbine rotor with individual blades; preferably air cooled blade components; includes steps of fabricating individual blades of the type shown in FIG. 1 into a ring.

This is accomplished in one method, by positioning and shimming individually cast blade or airfoils 10 in a tack weld fixture to form a ring of blades with a 0.003 to 0.005 inches controlled gap 14 between individual blades 10. Following positioning and shimming of individual blades, a tack weld 16 joins each of the component parts to form a bladed ring 18 as shown in FIG. 2.

Figure 2:
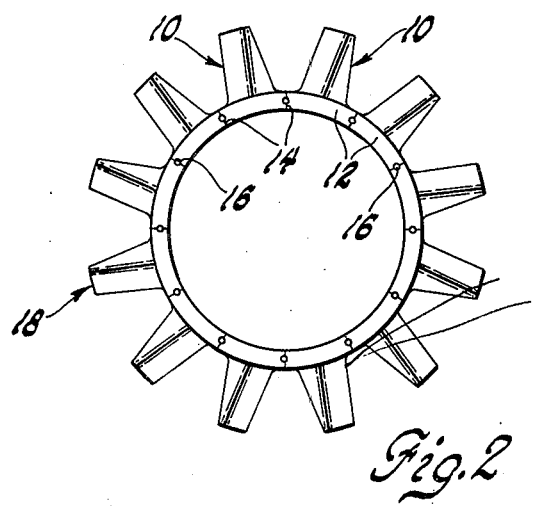
FIG. 2 is a view showing a plurality of joined airfoil components that define a bladed ring having an inside diameter.

The bladed ring 18 of FIG. 2 is tack welded at both the front and rear of each of the blades 10. The tack welded assembly then is vacuum outgassed at 2100° F. for one hour.

Figure 3:
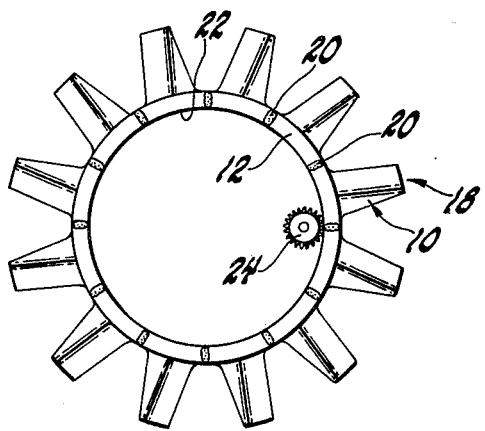
FIG. 3 shows the joined airfoil components and resultant ring of FIG. 2 having a central opening therethrough machined to a precise inside diameter.

The joined ring segments are then coated with a vacuum braze powder at the gaps 14 as shown at 20 in FIG. 3 to completely close the gaps 14 at outside, inside and ends of base 12. Preferably the braze powder is a boron-silicon modified braze powder alloy of a composition to be set forth. Vacuum brazing of the ring segments as shown in FIG. 3 is accomplished under vacuum at 2240° F. for thirty minutes followed by solidification and diffusion at 2150° F. for one hour to increase the braze remelt temperature. Alternatively, the vacuum braze seal can be conducted at 2240° F. for thirty minutes, followed by a temperature drop to 2000° F. for ten minutes; thereafter, temperature is increased to 2100° F. for one hour. Thereafter the parts are hot isostatically pressured to bond the ring segments at the interfaces therebetween.

Figure 4:
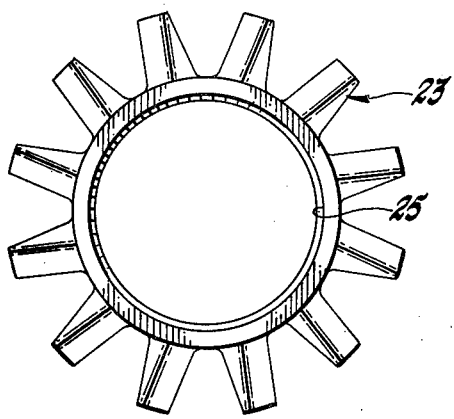
FIG. 4 shows a solid continuous bladed ring of highly solidified high alloy material with a precisely machined inside diameter.
Figure 5:
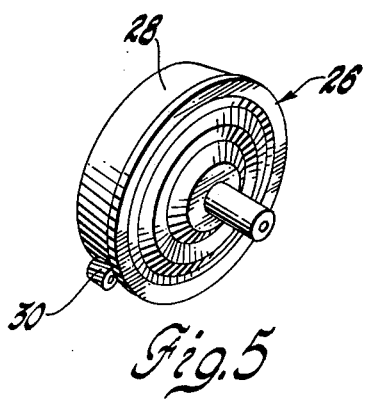
FIG. 5 shows a near-net-shape formed turbine disc preconsolidated by an isostatic process and including a precisely ground outside diameter surface for pressure fitting in the bladed ring.

After braze seal of gaps 14, and hot isostatic pressure bonding at the blade interfaces, the bladed ring 18 has an inside diameter 22 thereof machined by a suitable cutting tool 24 to produce a controlled diameter within the bladed ring 18 which represents an outer airfoil array. Alternatively, the bladed ring 18 can be preformed as a single continuous unit as shown at 23 in FIG. 4 with a machined ID 25. In this form, airfoils are integral with the base and form a continuous ring from which the airfoils may be extruded into a desired shape.

The method also includes preforming a disc 26 for insertion within the inside diameter 22 of the bladed ring 18. The disc 26 preferably is preformed from a desired metal composition.

The composition is hot isostatically pressed to form a consolidated disc 26 having an outside diameter at a near-net-shape corresponding to that of the inside diameter 22 of the bladed ring 18.

The disc 26 is slightly oversized and therefore machined to an exactly dimensioned rim OD diameter 28 by a cutting tool 30 so that the outside diameter of the disc will be dimensioned to provide a substantially press fit between the rim 28 and the inside diameter 22 of the joined bases 12 of the blades 10.

Figure 6:
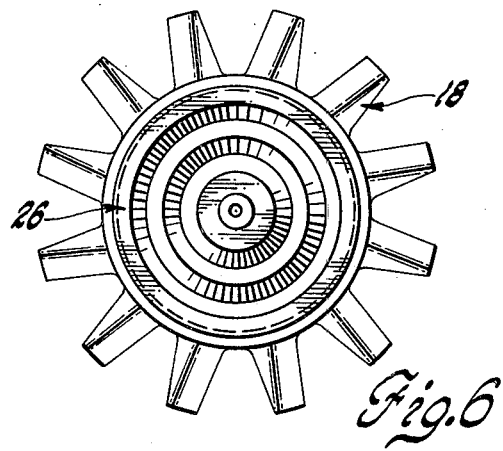
FIG. 6 shows the disc of FIG. 5 press fit to a bladed ring of the type shown in FIG. 4.

More specifically, the ID 22 and the OD of the rim 28 are sized to produce a 0.0005 to 0.00015 inch interference fit when the disc 26 is fit within the bladed ring 18 as shown in FIG. 6.

The parts are joined as shown in FIG. 6 by vacuum outgassing for one hour at 2100° F. followed by shrink fitting of the bladed ring 18 on the rim 28 by heating the bladed ring to approximately 400° F. and then slipping it on the rim 28 which is maintained at ambient temperature or below, e.g. minus 300° F. Upon return to ambient the ID 22 is solidly locked onto the disc rim 28 preparatory to a radio frequency induced disc expansion step in accordance with the present invention.

Materials which could be used in a working embodiment are as follows:

|  | Si | C | Cr | Co | Mo | W |
|---|---|---|---|---|---|---|
| Blades 10 | 0 | .15 | 9.0 | 10.0 | 2.5 | 10.0 |
| Disc 26 | 0 | .12 | 12.7 | 9.4 | 1.9 | 4.0 |
| Braze Powder | 2.5 | .17 | 10.0 | 9.7 | .6 | 10.8 |

|  | Ta | Ti | Al | B | Zr | Hf | Ni |
|---|---|---|---|---|---|---|---|
| Blades 10 | 1.5 | 1.5 | 5.5 | .02 | .05 | 1.0 | Bal. |
| Disc 26 | 3.8 | 4.1 | 3.5 | .01 | .02 | .9 | Bal. |
| Braze Powder | 3.1 | 1.6 | 5.5 | 1.1 | .05 | 1.4 | Bal. |

Other suitable high alloy material examples are AF95, AF2-IDA and Astroloy.

Once the disc 26 has been press fit at the controlled outer diameter 28 thereon into the precisely machined inside diameter 22 on the bladed ring 18, the parts are placed in a diffusion bonding apparatus 30. Apparatus 30, in accordance with the present invention, includes a vacuum tight enclosure 32 connected by a pipe 34 to the inlet of a vacuum pump 36 that discharges through a pipe 38 to atmosphere. The pipe 34 is in communication with an evacuated chamber 40 within the enclosure 32. An annular platform 42 is located inside enclosure 32. Platform 42 carries a ceramic workpiece support ring 44.

A pedestal 46 is located inboard of the platform 42. A radio frequency insulating ceramic plug 48 on pedestal 46 supports a central hub 50 on the disc 26.

A sidewall 52 of the enclosure 32 supports a receptable 54 for coupling a radio frequency induction concentrator coil assembly 55 to a water cooled, copper tube 56 that includes a coiled segment 58 located in juxtaposed relationship and beneath a split copper disc 60 that serves as a radio frequency power concentrator at a point underlying the disc 26.

The assembled bladed ring 18 and disc 26 are arranged so that the bases 12 on the bladed ring 18 are supportingly received by the ceramic support ring 44. The inner disc 26 is retained in place at a tapered, mating stop 61 on the bases 12 as shown in FIG. 7.

Figure 7:
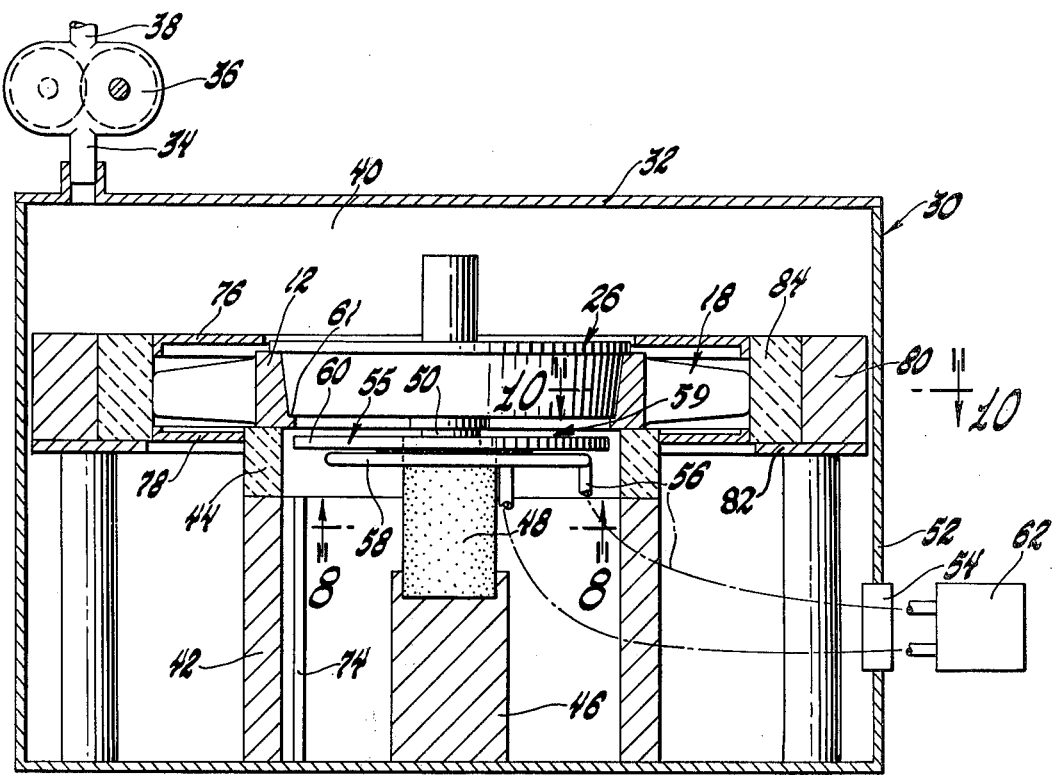
FIG. 7 is a diagrammatic showing of a radio frequency supply and vacuum chamber to process the joined parts in FIG. 6 to form a diffusion bonded, metallurgical joint therebetween.

With the parts assembled as shown in FIG. 7, the chamber 40 is evacuated and a predetermined amount of radio frequency power is directed into the evacuated chamber 40 via the water cooled copper tubing 56 which is arranged to produce a concentration of radio frequency power at the split copper disc 60. The concentration of power is such that the energy state in the radially inboard mass of the disc 26 is raised to produce a temperature increase therein so as to cause the disc 26 to grow radially outwardly into a firm interface contact with the inside diameter 22 of bladed ring 18.

In accordance with the present invention, the first stage of radio frequency energy heating of the disc 26 causes the aforesaid radial growth and thereafter the radio frequency power input rate is established to cause the disc 26 to have a temperature increase therein which is transmitted across the interface between the expanded disc 26 and the inside diameter 22 of the bladed ring 18 thereby to produce a controlled growth of metal crystals across the interface to produce a strong metallic interconnection therebetween by diffusion bonding.

In the present arrangement, no braze seal is required since the aforesaid bonding is achieved while heating the assembly in an evacuated chamber 40. Continuous vacuum pumping produced by the vacuum pump 36 maintains the evacuated chamber 40 at approximately $5 \times 10^{-5}$ millimeters of mercury total pressure. Such an evacuation of the chamber 40 causes the interface between the disc 26 and the bladed ring 18 to be clean and free from contamination during the diffusion bonding. Accordingly, the diffusion bonding pressures that are produced by the thermal growth of the disc 26 can cause the part to be bonded by continual intimate contact at the interface during the diffusion process.

The coil segment 58 acts as a primary coil in a step down transformer 59 with the disc 26 constituting the secondary coil of the transformer as well as the load for the secondary coil and with the coil segment 58 having power supplied thereto from a standard RF generator 62, for example a 10 KW high frequency induction heater unit manufactured by Lepel High Frequency Laboratories, Woodside, New York. The coil segment 58 is located so that the part of the wheel disc 26 mounted adjacent the coil segment 58 is heated according to the Joule heating effect expressed by $P = I^2 R$ where I is the induced current flowing within the disc 26 and R is the resistance of the current path within the disc 26.

Figure 8:
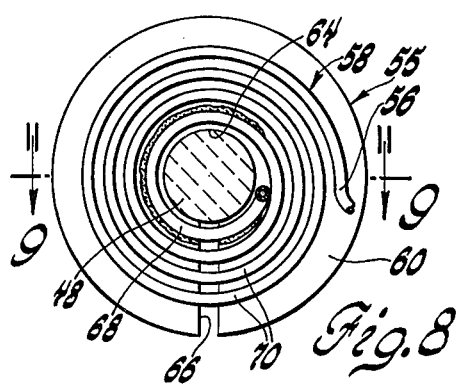
FIG. 8 is a horizontal sectional view taken along the line 8—8 of FIG. 7 looking in the direction of the arrows.
Figure 9:
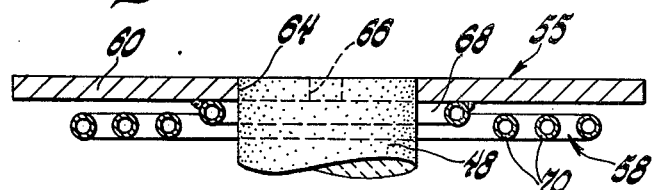
FIG. 9 is an enlarged, vertical sectional view taken along the line 9—9 of FIG. 8 looking in the direction of the arrows.

A typical concentrator coil assembly 55 is shown in FIG. 8 as including a disc of copper approximately $\frac{1}{8}''$ thick with a center hole 64 slotted radially at 66 of a dimension approximately $\frac{1}{8}''$ to 3/16'' wide. The inner first turn 68 of the coil segment 58 (preferably of $\frac{1}{4}''$ copper tubing which is water cooled) is silver soldered to the disc 60 with subsequent outer turns 70 of the coil segment 58 being spaced from the copper disc surface 72 in close spaced relationship therewith as shown in the enlarged cross sectional view of FIG. 9.

The ceramic support ring 44 and center ceramic pedestal support 46 are utilized to keep the RF induced currents in the concentrator coil assembly 58 from being coupled into the annular platform 42. Moreover, the annular platform 42 is of a pipe configuration which is cut through at a slot 74 on one side thereof to keep stray induced currents from flowing within the annular platform 42. Depending upon the required amount of energy concentration in the disc 26 to maintain a desired thermal growth and temperature at the interface between the disc 26 and the bladed ring 18, airfoil shield rings 76, 78 may or may not be used.

Figure 10:
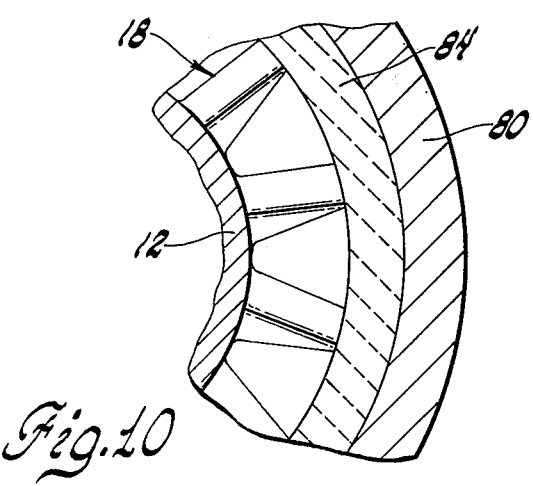
FIG. 10 is a fragmentary horizontal sectional view along line 10—10 of FIG. 7 looking in the direction of the arrows.
Figure 11:
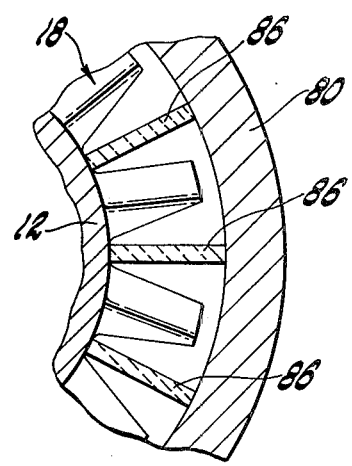
FIG. 11 is a view like FIG. 10 of a second embodiment of the invention.

In order to maintain the bladed ring 18 in a desired diffusion bonding contact relationship with the disc 26 after the disc has grown into contact with the bladed ring 18, a high modulus metallic retainer ring 80 is supported radially outwardly of the bladed ring 18 on a bracket 82 on wall 52. A ceramic spacer ring 84 is assembled between the expanded ring 18 and the retainer ring 80 as shown in FIG. 10. The retainer ring 80 may be water cooled if desired. In FIG. 11 a plurality of circumferentially spaced, radially directed ceramic or ceramic-faced pins 86 engage the base surface of blades 10 and engage the outer high modulus metal retainer ring 80 to produce the diffusion bond pressure. The ceramic ring 84 or the ceramic pins insulate the retainer ring from induced currents in bladed ring 18 following contact with disc 16. Further, they bridge the ring 18 to the retainer ring 80 of high modulus material. Such an arrangement prevents the bladed ring 18 from thermally growing at a rate equal to the thermal growth of disc 26 after the disc 26 and bladed ring 18 come into contact in response to initial thermal growth of the disc 26.

By virtue of this arrangement, an induced current flow in the bladed ring 18 is held to a minimum and thus the bladed ring 18 will not be resistance heated to the same extent as disc 26. However, the diffusion bond pressure and temperature will be maintained therebetween at the interface to cause grain growth across the outer diameter of the disc 26 to diffuse into the inside diameter of the bladed ring 18.

We claim:

1. A method for fabricating a hybrid, dual property wheel assembly comprising the steps of preforming a plurality of blade elements of a first predetermined highly solidified alloy material having a base, forming said blade elements into a bladed ring with a large diameter central opening, thereafter machining said opening to precise inside diameter on the bladed ring, preforming a metal disc with a controlled OD, fitting the bladed ring to the outer diameter of the metal disc to form front and rear face joint lines, radio frequency power heating said joined disc by placing a radio frequency induction power concentrator coil assembly adjacent the disc to cause the disc to constitute the secondary coil of a step-down transformer thereby to produce selective heating to cause it to thermally grow into radially pressed contact with the inside diameter at an interface therebetween, maintaining the outer surfaces of said radially pressed disc and bladed ring and the interface thereof under continuous vacuum and supplying radio frequency power to said disc to heat it by induction heating to maintain a diffusion bond temperature between said disc and said bladed ring whereby the parts are maintained at a process diffusion temperature sufficient to cause bond metal growth across the interface between the joined parts.

2. A method for fabricating a hybrid, dual property wheel assembly comprising the steps of preforming a plurality of blade elements of a first predetermined highly solidified alloy material having a base, forming said blade elements into a bladed ring with a large diameter central opening, thereafter machining said opening to a precise inside diameter on the bladed ring, preforming a powdered metal disc with a controlled OD, fitting the bladed ring to the outer diameter of the powdered metal disc to form front and rear face joint lines, radio frequency power heating said joined disc by placing a radio frequency induction power concentrator coil assembly adjacent the disc to cause the disc to constitute the secondary coil of a step-down transformer thereby to produce selective heating to cause it to thermally grow into radially pressed contact with the inside diameter at an interface therebetween, maintaining the outer surfaces of said radially pressed disc and bladed ring and the interface therebetween under continuous vacuum and supplying radio frequency power to said disc to heat it by induction heating to maintain a diffusion bond temperature between said disc and said bladed ring whereby the parts are maintained at a process diffusion temperature sufficient to cause bond metal growth across the interface between the joined parts, placing a high modulus retainer ring to surround said bladed ring, interposing an insulator member between said retainer ring and said bladed ring to bridge said last mentioned ring thereby to prevent said bladed ring from thermally growing at a rate equal to said disc when said disc and said bladed ring come into contact with one another in response to initial thermal growth of said disc.

* * * * *